(12) United States Patent
LaBarge et al.

(10) Patent No.: US 6,886,403 B2
(45) Date of Patent: May 3, 2005

(54) SENSOR WITH AMORPHOUS ELECTRODE

(75) Inventors: William J. LaBarge, Bay City, MI (US); Conrad H. Anderson, Davidson, MI (US); Hugh W. Ireland, Clio, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/464,713

(22) Filed: Jun. 17, 2003

(65) Prior Publication Data

US 2004/0255669 A1    Dec. 23, 2004

(51) Int. Cl.[7] .............................................. G01F 23/00
(52) U.S. Cl. ........................ 73/304 C; 73/317; 73/305
(58) Field of Search .......................... 73/314, 312, 305, 73/290 R, 317, 304 C

(56) References Cited

U.S. PATENT DOCUMENTS

| | | | |
|---|---|---|---|
| 4,702,107 A | 10/1987 | Guerrini et al. | |
| 4,779,460 A | 10/1988 | Cruickshank | |
| RE32,925 E | 5/1989 | Chen et al. | |
| 4,923,770 A | 5/1990 | Grasselli et al. | |
| 5,267,475 A | 12/1993 | Gaston | |
| 5,559,065 A * | 9/1996 | Lauth et al. | 502/5 |
| 5,656,852 A * | 8/1997 | Nishioka et al. | 257/632 |
| 5,740,854 A | 4/1998 | Inoue et al. | |
| 5,743,136 A | 4/1998 | Gaston et al. | |
| 5,746,088 A | 5/1998 | Sawert et al. | |
| 5,811,851 A * | 9/1998 | Nishioka et al. | 257/310 |
| 5,882,736 A | 3/1999 | Stein et al. | |
| 5,897,965 A | 4/1999 | Itoh et al. | |
| 6,021,668 A | 2/2000 | Sawert et al. | |
| 6,083,570 A | 7/2000 | Lemelson et al. | |
| 6,346,178 B1 | 2/2002 | Lankheet | 264/424 |
| 6,588,253 B2 | 7/2003 | Lambert et al. | 73/53.01 |
| 6,634,210 B1 | 10/2003 | Bosch et al. | 73/23.33 |
| 6,730,415 B2 * | 5/2004 | Shibuya et al. | 428/670 |
| 2003/0033858 A1 | 2/2003 | Lambert et al. | |
| 2003/0060873 A1 * | 3/2003 | Gertner et al. | 623/1.15 |

OTHER PUBLICATIONS

E.F. Smith, III and Hugh W. Ireland, "Design Guidelines for Automotive Fuel Level Sensors", Society of Automotive Engineers, Inc. (2002).
Pelletier et al., "Mechanical Properties of Amorphous Metallic Materials: Viscoelasticity and Viscosity", Science of Metastable and Nanocrystalline Alloys Structure, Properties and Modelling, Denmark 2001. (Abstract).
U.S. Appl. No. 10/146,743, filed May 16, 2002.
U.S. Appl. No. 10/150,675, filed May 17, 2002.
U.S. Appl. No. 10/117,833, filed Apr. 8, 2002.
http://www.memagazine.org/backissues/june98/features/metallic/metallic.html "Metallic Glasses Bulk Up" (6 pages).
http://www.macindustrialproducts.com/entypes.html "EN Types" (2 pages).
http://www.metglas.com/product/pages (3 pages).

(Continued)

Primary Examiner—Hezron Williams
Assistant Examiner—Rodney Frank
(74) Attorney, Agent, or Firm—Jimmy L. Funke

(57) ABSTRACT

Disclosed herein are sensors, and method for making an using the same. In one embodiment, the sensor comprises: a first electrode disposed on a ceramic substrate, wherein the first electrode comprises an amorphous metal material comprising a first metal selected from the group consisting of a Group 9 metal, a Group 10 metal, a Group 11 metal, and combinations comprising at least one of the foregoing first metals, and zirconium or at least one of phosphorus and boron.

21 Claims, 5 Drawing Sheets

OTHER PUBLICATIONS

Onoda et al., "Mechanism of boron codeposition in electrodeposited Ni-B alloy films and calculation of the amount of codeposited boron", Transactions of the Institute of Metal Finishing, 77: 44-48 Part 1 Jan. 1999. (Abstract).

Tsai et al., "Thermal stability and mechanical properties of Ni-W-P electroless deposits", Surface and Coatings Technology, 146: 502-507 Sep.-Oct. 2001. (Abstract).

Ashassi-Sorkhabi et al., "Electroless deposition of Ni-Cu-P alloy and study of the influences of some parameters on the properties of deposits", Applied Surface Science, 185 (3-4): 155-160 Jan. 15, 2002. (Abstract).

Yi et al., "The effects of the concentration of individual reactants on Fe-Ni-P-B nanoparticles fabricated by chemical reduction", Journal of Materials Processing Technology, 117 (1-2): 37-42 Nov. 2, 2001. (Abstract).

Wayne D. Rupert, "Brazing with copper phosphorus alloys", Refrigeration Service & Contracting, v 65, n 1, Jan. 1997 p 54-57. (Abstract).

Richard E. Ballentine, "Silver's role in phosphorus-copper brazing filler metals", Welding Journal (Miami, Fla), v 73, n 10, Oct., 1994, p 41-42. (Abstract).

Willnecker et al., "Undercooling investigations and heat capacity measurements on Pd-Ni-P melts", Journal of Non-Crystalline Solids, v 156-58, pt 1, May 2, 1993. (Abstract).

Alamgir et al., "X-ray photoelectron spectroscopy analysis of bulk Pd-Ni-P metallic glasses", Philosophical Magazine B: Physics of Condensed Matter; Statistical Mechanics, Electronic, Optical and Magnetic Properties, v 79, n 2, Feb., 1999, p 239-247. (Abstract).

He et al., "Synthesis and properties of bulk metallic glasses in Pd-Ni-P and Pd-Cu-P alloys", Materials Research Society Symposium Proceedings, v 455, 1997, Structure and Dynamics of Glasses and Glass Formers, Proceedings of the 1996 MRS Fall Meeting, Dec. 2-6, 1996, Boston, MA, USA, P 495-500. (Abstract).

Lee et al., "Effect of phosphorus addition on the corrosion behavior of amorphous Ni-30Ta-P alloys in 12 M HCl", Corrosion Science, v37, 2, Feb., 1995, p 321-330. (Abstract).

Lee et al., "Effect of phosphorus addition on the corrosion behavior of arc-melted Ni-10Ta-P alloys in 12 M HCl", Corrosion Science, v38, 3, Mar., 1996, p 469-485. (Abstract).

Nishiyama et al., "Flux treated Pd-Cu-Ni-P amorphous alloy having low critical cooling rate", Materials Transactions, JIM, v 38, n 5, May, 1997, p 464-472. (Abstract).

Schroers et al., "Crystallization of bulk glass forming Pd-based melts", Materials Science Forum, v 360-362, 2001, Metastable, Mechanically Alloyed and Nanocrystalline Materials (ISMANAM 2000), Jul. 9-14, 2000, Oxford, p 79-84. (Abstract).

Lambert et al., "Study of electroless nickel coatings containing low phosphorus", Thin Solid Films, v 177, n 1-2, Oct., 1989, p 207-223. (Abstract).

Dian et al., "Chemical interaction at the Pd-B interface", Journal of Magnetism and Magnetic Materials, v 126, n 1-3, Sep., 1993., Proceedings of the 1st International Symposium on Metallic Multilayers, Mar. 1-5, 1993, Kyoto, Jpn, p 25-27. (Abstract).

Liao et al., "B-Pd (boron-palladium) system", Journal of Phase Equilibria, v17, 4, Aug., 1996, P 340-346. (Abstract).

Beck et al., Unit cell parameters and densities of the solid solution Pd(B), Materials Science Forum, v321 (II, 2000, Proceedings of the 1998 6th European Powder Diffraction Conference (EPDIC 6), Aug. 22-Aug. 25, 1998, Budapest, Hung, p 604-609. (Abstract).

Boonekamp et al., "Selective metallization of silicon surfaces the adsorption of sterically stabilized palladium particles on H-terminated Si(100), Si3N4, and SiO2", Journal of the Electrochemical Society, v142, Feb. 2, 1995, p 519-524. (Abstract).

Kawashima et al., "Structure and corrosion behavior of electro-deposited Ni-P alloys", Corrosion Engineering, v 38, n 11, 1989, p 643-653. (Abstract).

Ivanov, MV, "Electroless nickel-boron-phosphorus coatings: Protective and functional properties", Protection of Metals, 37 (6): 592-596 Nov.-Dec. 2001. (Abstract).

Japanese Abstract for JP7118866.

B. M. Mohamed et al., "Kinetics and mechanism of formation of tricalcium aluminate, Ca3Al2O6", Thermochimica Acta 6944 (2002) 1-10.

* cited by examiner

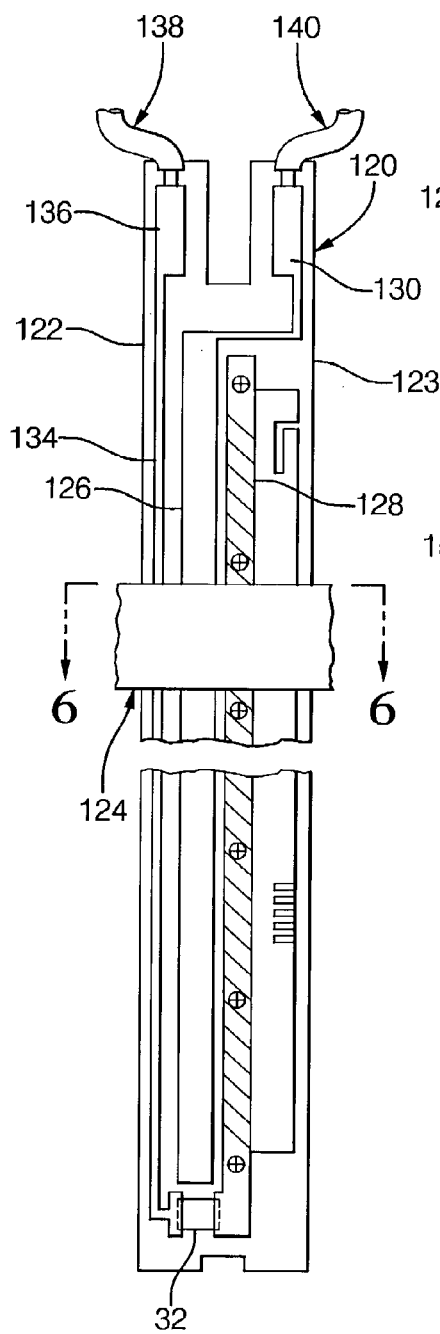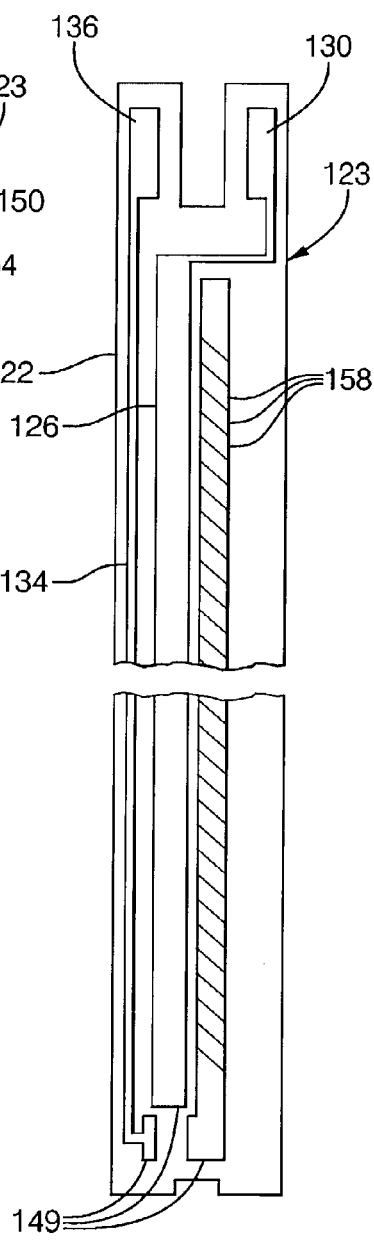
FIG. 5  FIG. 7  FIG. 8

SENSOR WITH AMORPHOUS ELECTRODE

BACKGROUND OF THE INVENTION

In a first standard design, contacts located on a wiper assembly form a shorting bar across a resistor on the ceramic card and a conductor on the ceramic card. A prior art ceramic resistor card 10 is shown in FIG. 1. A wiper button makes contact at designated intervals with conductive bars 12 emanating from a resistive ink 14 printed over the conductive bars. A second wiper button rides on a flat continuous conductive path 16 screened onto the ceramic substrate. An alloy of copper, zinc and nickel known as "silver nickel" is used as a material for the contacts due to the relative softness of this material and its relative low cost. Substantial material volume must be utilized to allow for the significant contact wear to insure part durability.

In a second standard design, contacts located on the wiper assembly form a shorting bar across a resistor on a ceramic card and a metal conductor plate. The wiper contact button makes contact at designated intervals with conductive bars emanating from underneath the resistor ink. The second contact button rides on the metal plate.

Both of these standard designs are susceptible to the buildup of contact resistance. Contact resistance can change the output value of the resistor assembly or in some instances can cause "open circuit" conditions. "Silver nickel" has a tendency to oxidize under environmental conditions found in today's gasoline fuel tanks, and with an increased use of oxygenated fuels. With the designs described above, relatively high forces are used to cause abrasion or wear against the ink/ceramic surface or the metal contact plate. Contact wear is further aggravated by the presence of the fuel. The fuel washes the abrasive surfaces, thereby "renewing" the cutting surfaces of the abrasives in the ceramics and the inks. In contrast, the contact wear under dry conditions creates "smooth" surfaces as surface irregularities are filled in with abraded material. "Burn through" is achieved when sufficient voltage is applied to the circuit to overcome the contact resistance. The designs described above require a voltage that can produce 25 milliamperes (mA) to overcome contact resistance on a consistent basis.

Current electrodes employ high amounts of economically costly precious metals in their manufacture. These precious metals are also vulnerable to the environmental poisons to which they are subjected, thereby diminishing the potential life span of the electrode. Therefore, what is needed is an improved electrode capable of the same or a higher level of performance as existing electrodes, with the effect of lower manufacturing costs and longer life-spans.

SUMMARY OF THE INVENTION

Disclosed herein are sensors, and method for making and using the same. In one embodiment, the sensor comprises: a first electrode disposed on a ceramic substrate, wherein the first electrode comprises an amorphous metal material comprising a first metal selected from the group consisting of a Group 9 metal, a Group 10 metal, a Group 11 metal, and combinations comprising at least one of the foregoing first metals, and zirconium or at least one of phosphorus and boron.

In one embodiment, a fuel level indicator sensor comprises: a resistive card having an arc shaped resistive path comprising a first set of spaced apart connector lines and an arc-shaped electrode overlying the first set of conductor lines; and an arc-shaped conductive path comprising an arc-shaped continuous conductor base and a second set of spaced apart parallel conductor lines extending from the conductor base at an angle with respect to the radial line drawn from a center of the arc-shaped conductor base. The electrode comprises an amorphous metal material comprising a first metal selected from the group consisting of a Group 9 metal, a Group 10 metal, a Group 11 metal, and combinations comprising at least one of the foregoing first metals, and zirconium or at least one of phosphorus and boron.

In one embodiment, a method for detecting fuel level comprises: contacting the fuel level sensor with a fuel in a fuel storage vessel, determining the resistance between the connector lines, and using the resistance to determine the level of the fuel.

The above-described and other features will be appreciated and understood by those skilled in the art from the following detailed description, drawings, and appended claims.

BRIEF DESCRIPTION OF THE DRAWINGS

Referring now to the figures wherein the like elements are numbered alike:

FIG. 5 is a front view of a fluid level sensor;

FIG. 7 is a front view of a substrate of a fluid level sensor with a resistive layer applied;

FIG. 8 is a front view of a substrate of a fluid level sensor with a conductive layer applied;

DESCRIPTION OF THE PREFERRED EMBODIMENT

Figure 1:
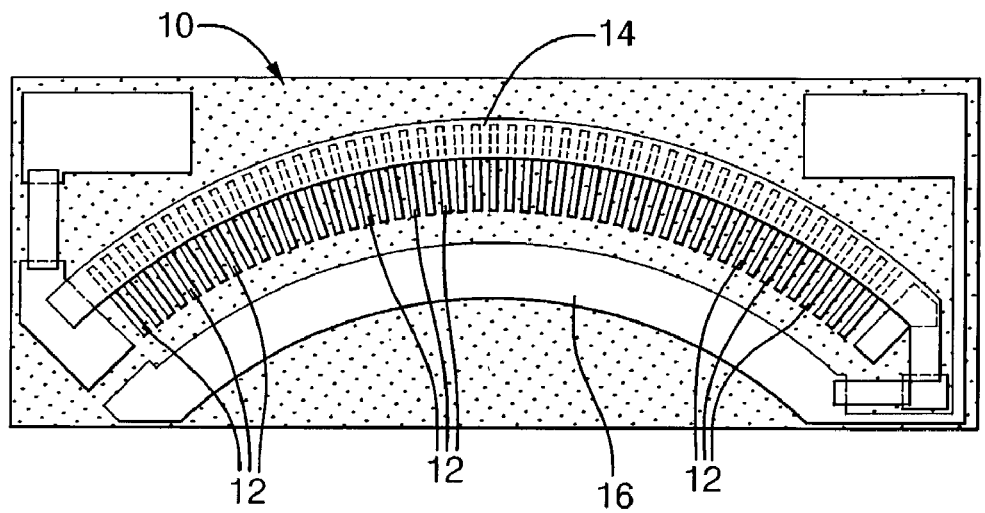
FIG. 1 is an illustration of a prior art ceramic resistor card for a fuel level indication system.

Disclosed herein is an oxidation resistant material that is particularly useful as an electrode for various applications, e.g., in a fuel level indication system, in sensors, and the like. This resistant material, as opposed to employing crystalline metals, employs amorphous metal materials (otherwise known as glassy metals) solely or in combination with the crystalline metals. The resistant material, therefore, may comprise an amorphous metal material comprising a Group 9 metal, a Group 10 metal, a Group 11 metal and phosphorous and/or boron; or comprising a Group 9 metal, a Group 10 metal, a Group 11 metal and zirconium, and optionally comprising aluminum and/or titanium, wherein "Group" refers to the Groups of the Periodic Table of Elements.

To facilitate bonding of the resistant material (e.g., the amorphous material) to a ceramic (e.g., aluminum oxide), several different techniques may be used. Bonding could be facilitated by employing a bonding agent (e.g., an epoxy) either mixed with the amorphous metal material and/or as a layer between the amorphous metal material and the ceramic. Some of the alternatives include that the electrode could comprise amorphous metal material (e.g., powder, or the like) and an epoxy, the electrode could comprise an amorphous metal material (e.g., in the form of a ribbon or the like) bonded to the substrate by epoxy, the electrode could comprise amorphous metal material (e.g., powder, or the like) bonded to the substrate by a metal (e.g., nickel), the electrode could comprise amorphous metal material (e.g., powder, or the like) bonded to the substrate by a catalyst (e.g., a palladium-boron catalyst), the electrode could comprise a catalyst (e.g., palladium or the like) and amorphous metal material, with a catalyst surface coating (e.g., palladium boron surface coating or the like) disposed between the catalyst/amorphous metal material and the substrate. Essentially, a bonding material, e.g., epoxy(ies), metal(s), catalyst (s), and the like, as well as combinations comprising at least one of the foregoing bonding materials can be mixed with the amorphous material and/or disposed between the amorphous material and the substrate. For example, an aluminum oxide ceramic component can be coated with a thin metallic layer, consisting of such as ductile nickel, and an amorphous metal. In this embodiment, the wiping action will be against the hard amorphous metal layer. There will be no sulfide deposition on the nickel layer, because the nickel layer will not be exposed to the fuel.

An electrode comprising the amorphous metal material can comprise greater than or equal to about 50 wt % amorphous metal material, with greater than or equal to about 75 wt % amorphous metal material preferred, greater than or equal to about 85 wt % amorphous metal material more preferred, and greater than or equal to about 95 wt % amorphous metal material especially preferred, balance a ductile crystalline phase, based upon the total weight of the fired electrode. Some examples of ductile phases, often called a matrix, are cobalt, nickel, silver, gold, aluminum, iron, and the like, as well as combinations comprising at least one of the foregoing ductile materials, wherein the ductile materials do not contain anions such as phosphorus, sulfur, oxygen, chlorine, etc. For example, ductile nickel would contain less than or equal to about 0.1 atomic percent (at %) anions. Preferably the ductile material comprises less than or equal to about 0.05 at % anions, with less than or equal to about 0.03 at % phosphorus preferred, based upon the total weight of the ductile material. Especially preferred is sufficient amount of amorphous metal material such that an amorphous electrode is formed. Not to be limited by theory, it is believed that the crystalline phase may serve as a crack stopper that improves the damage tolerance. As used herein, amorphous metal materials are those metal materials that lack a crystalline shape upon cooling the metal below its melting temperature, that is, comprise no long range order (e.g., materials having grain sizes of less than 10 nanometers (nm)).

Generally, the electrode comprises an amorphous metal material having sufficient electrical conductivity to enable detection of a resistivity and sufficient thickness to enable make and maintain the desired electrical contacts. Preferably, an electrode has a resistivity of less than or equal to about 5 ohms, with less than or equal to about 4 ohms preferred, and less than or equal to about 1 ohm more preferred. The only upper limit on the thickness of the ink is based upon practicality, system space limitations, and cost efficiency. The thickness is typically about 10 micrometers ($\mu$m) to about 400 $\mu$m or so, with a thickness of less than or equal to about 300 $\mu$m preferred, with less than or equal to about 200 $\mu$m more preferred, less than or equal to about 125 $\mu$m even more preferred, and less than or equal to about 75 $\mu$m especially preferred. Also preferred within this range is a thickness of greater than or equal to about 15 $\mu$m, with greater than or equal to about 20 $\mu$m more preferred, and greater than or equal to about 30 $\mu$m even more preferred.

The amorphous metal material comprises a first metal (a Group 9, 10, and 11 metals, and combinations comprising at least one of the foregoing first metals), and a non-metal (phosphorous, boron, and combinations comprising at least one of the foregoing non-metals, with phosphorous preferred). The first metals include nickel (Ni), palladium (Pd), platinum (Pt), iridium (Ir), rhodium (Rh), cobalt (Co), copper (Cu), silver (Ag), gold (Au) and combinations comprising at least one of the foregoing first metals. Preferably, the first metal comprises at least one of nickel, silver, palladium, and/or copper, and the non-metal phosphorus; e.g., Pd—Cu—Ni—P, Pd—Ni—P, or Pd—Cu—P, and the like.

The electrode comprises a sufficient amount of the first metal(s) to obtain an amorphous metal material. The electrode may comprise about 10 atomic percent (at %) to about 98 at % of the first metal. All atomic percents set forth herein are based upon the total atoms of the first metal, second metal, and non-metal, unless otherwise specified. Within this range, the first metals are preferably present in an amount of greater than or equal to about 20 at %, with greater than or equal to about 45 at % more preferred. Also within this range, an amount of first metal of less than or equal to about 98 at % is preferred, with less than or equal to about 94 at % more preferred. The first metal is a metal chosen from the first group, for example, 43 at % Pd. The second metal is a metal chosen from the first group, for example 27 at % Cu. The third metal is a metal chosen from the first group, for example 10 at % Ni. The element chosen from the non-metal group is phosphorus. The amorphous metal is $Pd_{43}Cu_{27}Ni_{10}P_{20}$. The amorphous metal could consist of a metal chosen from the first group, for example 30 at % Cu, a metal chosen from the first group, for example 5 at % nickel, a metal chosen from the second group, for example 10 at % Al and a metal chosen from the second group, for example 55 at % zirconium. The amorphous metal is $Cu_{30}Ni_5Al_{10}Zr_{55}$.

Amorphous metal materials may further comprise second metal(s) primarily from Groups 3, 4, and 5. Possible second metals include yttrium (Y), lanthanum (La), titanium (Ti), zirconium (Zr), hafnium (Hf) and niobium (Nb) and combinations comprising at least one of the foregoing second metals. The amorphous metals formed from the second metals may comprise about up to about 60 at % of the combined weight of the second metals in the fired electrode, with about 2 at % to about 60 at % preferred when the second metal(s) are employed. Within this range, the second metal(s) are preferably present in an amount of greater than or equal to about 3 at %, with greater than or equal to about 20 at % more preferred. Also within this range, an amount of second metal of less than or equal to about 55 at % is preferred, with less than or equal to about 50 at % more preferred.

In one embodiment, the non-metal portion of the electrode preferably comprises a sufficient amount of boron (B) and/or phosphorous (P), to fill a sufficient number of the electrode sites available for reaction with elements, such as sulfur, to inhibit sulfur poisoning. Essentially, sulfur (e.g., $S^{-2}$), and similar elements, in an oxidizing environment, can form a sulfide, for example. As more sulfides form on the original sulfide, a scale builds up on the electrode, decreasing its resistivity, and in the case of the fuel level indicator, inhibits obtaining an accurate level reading. Preferably, greater than or equal to about 80% of the sites are occupied by the non-metal, with greater than or equal to about 90% preferred, and greater than or equal to about 95% more preferred. Essentially, since the amorphous metals do not have grain boundaries, there are no corrosion initiation sites, and sulfide layers will not deposit thereon. The electrode may comprise about 0.5 at % to about 30 at % of the non-metal; e.g., about 47 at % Pd, about 47 at % Ni and about 6 at % P based on the total weight of the fired electrode. Within this range, the electrode preferably comprises greater than or equal to about 0.5 at % of the non-metal, with greater than or equal to about 3.0 at % more preferred, and greater than or equal to about 6.0 at % particularly preferred. Also within this range, the electrode preferably comprises less than or equal to about 25 at % of the non-metal.

A first type of amorphous metal electrode comprising one or more elements from Groups 9, 10, and 11, in combination with phosphorus, is the preferred type. Of this first type, amorphous metal electrode comprising 1 element from Groups 9, 10, and 11, and phosphorus (such as Ni—P, Pd—P, Pt—P, Cu—P, Ag—P, Au—P, and the like) can be employed, with amorphous metal electrode comprising 2 elements from Groups 9, 10, and 11, and phosphorus (such as Ni—Pd—P, Ni—Cu—P, and the like) preferred, and amorphous metal electrode comprising 3 or more elements from Groups 9, 10, and 11, and phosphorus (such as Ni—Ag—Pd—P, and the like) more preferred.

The second type of amorphous metal electrode contains 1 or more elements from Groups 9, 10, and 11 in combination with boron, is preferred over the third type. Of this second type, the amorphous metal electrode can contain 1 element from Groups 9, 10, and 11 and boron (such as Ni—B, Pd—B, Pt—B, Cu—B, Ag—B, Au—B, and the like), with 2 elements from Groups 9, 10, and 11 and boron (such as Ni—Pd—B, Ni—Cu—B, and the like) preferred, and 3 or more elements from Groups 9, 10, and 11 and boron (such as Ni—Ag—Pd—B, and the like) more preferred.

The third type of amorphous metal electrode, which contains 2 or more elements from Groups 9, 10, and 11 in combination with elements from Groups 3, 4, and 5 such as zirconium, and titanium and may optionally include Groups 12 and/or 13 elements such as aluminum and/or zinc. For example, of this third type, the amorphous metal electrode may contain 2 elements from Groups 9, 10, and 11 and 1 element from Group 4 (such as Ni— Cu—Zr, Ni—Ag—Zr, and the like), and/or 2 elements from Groups 9, 10, and 11, and 1 element from Group 13 and 1 element from Group 4 (such as Ni—Cu—Al— Zr, Ni—Ag—Al—Zr, and the like). Of this third type, the amorphous metal electrode may contain 2 elements from Groups 9, 10, and 11 and 1 element from Group 12 (such as Ni—Cu—Zn, Ni—Ag—Zn, and the like), and/or 3 elements from Groups 9, 10, and 11, and 1 element from Group 12 (such as Pd—Ni—Cu— Zn, Ag—Ni—Cu—Zn, and the like). Preferably, the third type of amorphous metal electrode contains 3 or more elements from Groups 9, 10, and 11, and 1 element from Group 13 and 1 element from Group 4 (such as Ni—Cu—Ag—Al—Zr, Ni—Cu— Au—Al—Zr, and the like).

A fourth type or layered material, can also form the amorphous metal material. This layered amorphous metal material comprises layers having a thickness such that, when layered, the layered structure has no long range order such that the material is detected as amorphous, that is, no evidence of crystalline material is detected when examined by X-ray diffraction. Generally, the layers are thin layers (e.g., less than or equal to about 500 micrometers thick). Preferably, the layers have a thickness of less than or equal to about 100 micrometers, with less than or equal to about 50 micrometers more preferred, less than or equal to about 25 micrometers even more preferred. For example, for a 500 micrometer thick electrode, the layers could comprise one layer of crystalline ductile nickel less than or equal to about 8 micrometers thick, then an amorphous layer of metal(s), then a crystalline layer of ductile nickel less than or equal to about 8 micrometers thick, and so on until an electrode of less than or equal to about 75 micrometers thick is formed. Even though some of the material in the 75 micrometers thick layer is crystalline, there is no long range order, so the material is detected as amorphous and is considered to be amorphous. In the layered structure, the layers can comprise layers of a ductile metal (e.g., ductile nickel, copper, cobalt, indium, bismuth, lead, cadmium, tin, and alloys of these metals, and the like), layered with layers of amorphous metals such as $Pd_{40}Ni_{40}Cu_{15}P_5$, and the like, as well as alloys and combinations comprising at least one of the foregoing metals.

An exemplary electrode comprises a thick film (about 10 to about 130 micrometers thick) electrode comprising a 65 micrometer layer of an amorphous metal material, such as $Pd_{40}Ni_{40}Cu_{15}P_5$, or the like, bonded to a substrate via ductile nickel metal bonding layer. Typically, the bonding layer has a thickness of less than or equal to about 20 micrometers, with a thickness of less than or equal to about 10 micrometers preferred.

The electrode can be formed in any fashion capable of producing amorphous materials that will not adversely affect the structural integrity of the substrate. An exemplary application of an ink comprising the first, second, or third type of amorphous metal material, or the layered amorphous material, is as an electrode component. The electrode may be formed, for example, by preparing the ink, and then applying the ink to a substrate by screen-printing or any other method that obtains the desired thickness for the particular application. The resulting inked-substrate may then be fired below the critical transformation temperature (e.g., about 450° C.) of the amorphous metal. For example, the inked-substrate can be heated to a temperature of about 350° C. to about 400° C., with heating to about 350° C. for about 40 minutes prior to cooling preferred.

When the electrode is formed by screen-printing the ink onto a substrate, the ink may optionally be combined with print-screening agents to form a paste. Such a paste eases the screen-printing process. The print screening agents may comprise a binder, a carrier, wetting agents, and the like, and combinations comprising at least one of the foregoing print screening agents. The binder may be any material capable of providing adhesion between the ink and the substrate. Suitable binders include acrylic resin, acrylonitrile, styrene, acrylic acid, methacrylic acid, methyl acrylate, and methyl methacrylate. The carrier may include any material suitable for imparting desired printing and drying characteristics of the ink. In general, the carrier includes a polymer resin dissolved in a volatile solvent. The wetting agent may include ethanol, isopropyl alcohol, methanol, cetyl alcohol, calcium octoate, zinc octoate. For example, the ink may consist of about 10 wt % to about 30 wt % 1-methoxy-2-propanol acetate solvent, about 10 wt % to about 30 wt % butyl acetate solvent, about 5 wt % to about 10 wt % acrylic resin binder, less than or equal to about 5 wt % methyl methacrylate polymer, about 5 wt % to about 10 wt % ethanol wetting agent, and about 30 wt % and about 60 wt % amorphous metal material (Ni—P—Zr). This ink has desirable reflow properties at temperatures of 240° C.

When employed in a fuel level indication sensor, the ink is disposed on a substrate commonly referred to as a card. This card can comprise any material compatible with the fuel level indication sensor environment, e.g., exposure to the particular fuel constituents, and other environmental conditions such as temperature fluctuations. Possible substrates include materials having a sufficient dielectric strength (e.g., greater than or equal to about 50 volts/mil, preferably 200 volts/mil or greater), such as aluminum oxide ($Al_2O_3$), zirconium oxide ($ZrO_2$), titanium oxide ($TiO_2$), zirconium toughened aluminum oxide ($ZrO_2$—$Al_2O_3$), mullite ($3Al_2O_3 \cdot SiO_2$), aluminum nitride (AlN), boron nitride (BN), fused silica ($SiO_2$), $MgTiO_3$— $CaTiO_3$, aluminum oxide-titanium oxide glass composition, cordierite-glass composition ($Li_2O$)-alumina ($Al_2O_3$)-silica ($SiO_2$) system, a magnesium oxide (MgO)—$Al_2O_3$—$SiO_2$ system, a sodium oxide ($Na_2O$)-barium oxide (BaO)—$Al_2O_3$— $SiO_2$ system, a $Li_2O$—MgO—$Al_2O_3$—$SiO_2$ system, a potassium oxide ($K_2O$)—MgO— $Al_2O_3$—$SiO_2$ system, metal oxides, and the like, as well as combinations comprising at least one of the foregoing metal oxides), and the like, as well as combinations comprising at least one of the foregoing materials. Some examples of possible substrate materials include aluminum oxide-zirconium oxide, titanium oxide-zirconium oxide, and aluminum oxide gallium oxide, with aluminum oxide preferred for reasons of cost.

Figure 3:
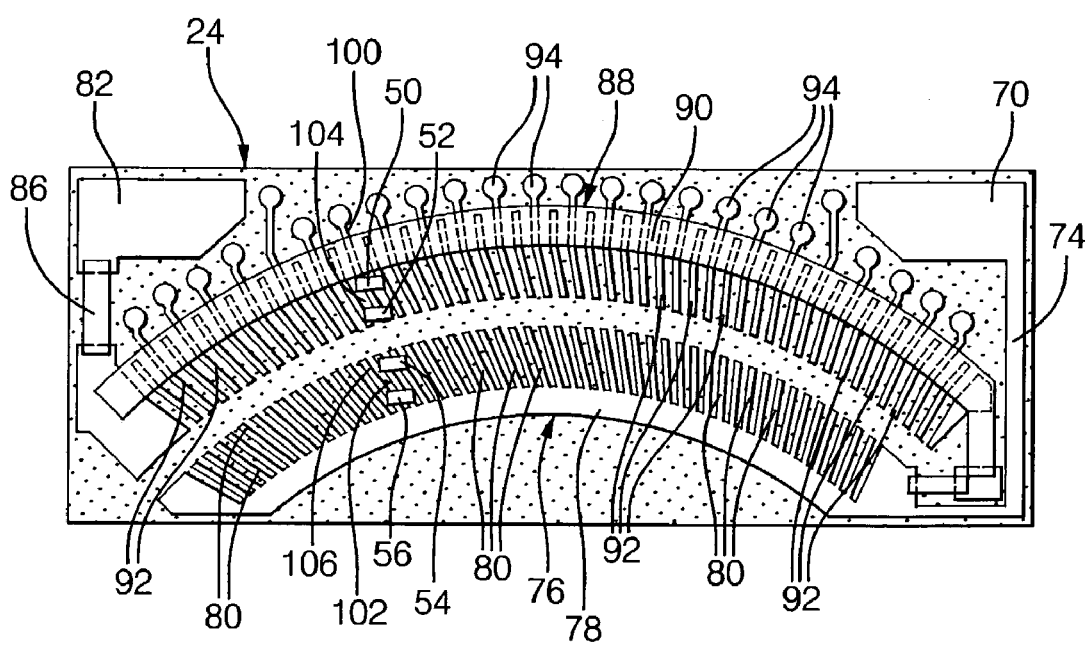
FIG. 3 is an enlarged view of a ceramic resistor card for a fuel level indication system of FIG. 2 as viewed in the direction of arrows 3—3.
Figure 2:
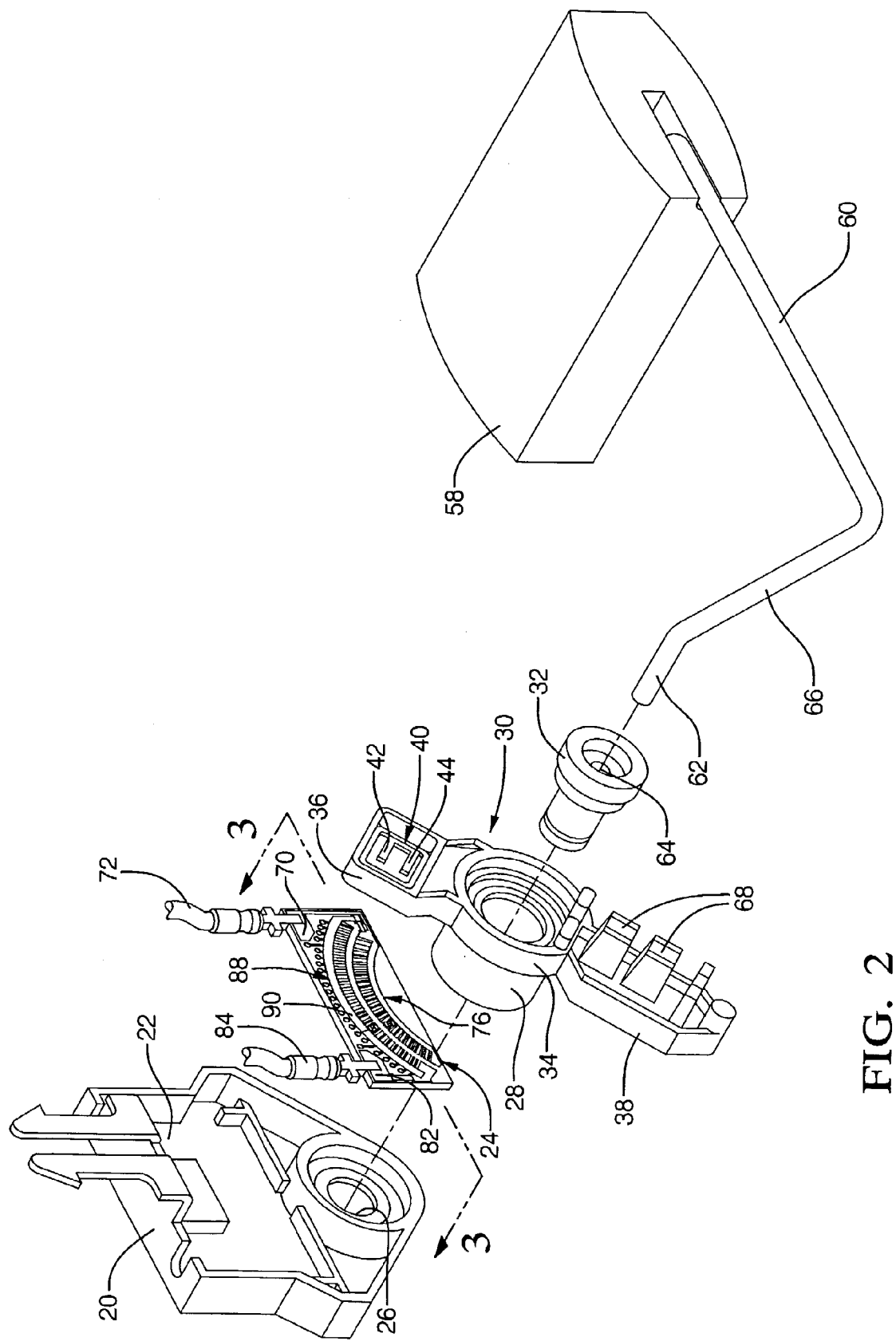
FIG. 2 is an exploded view of one embodiment of a fuel level indication system.
Figure 4:
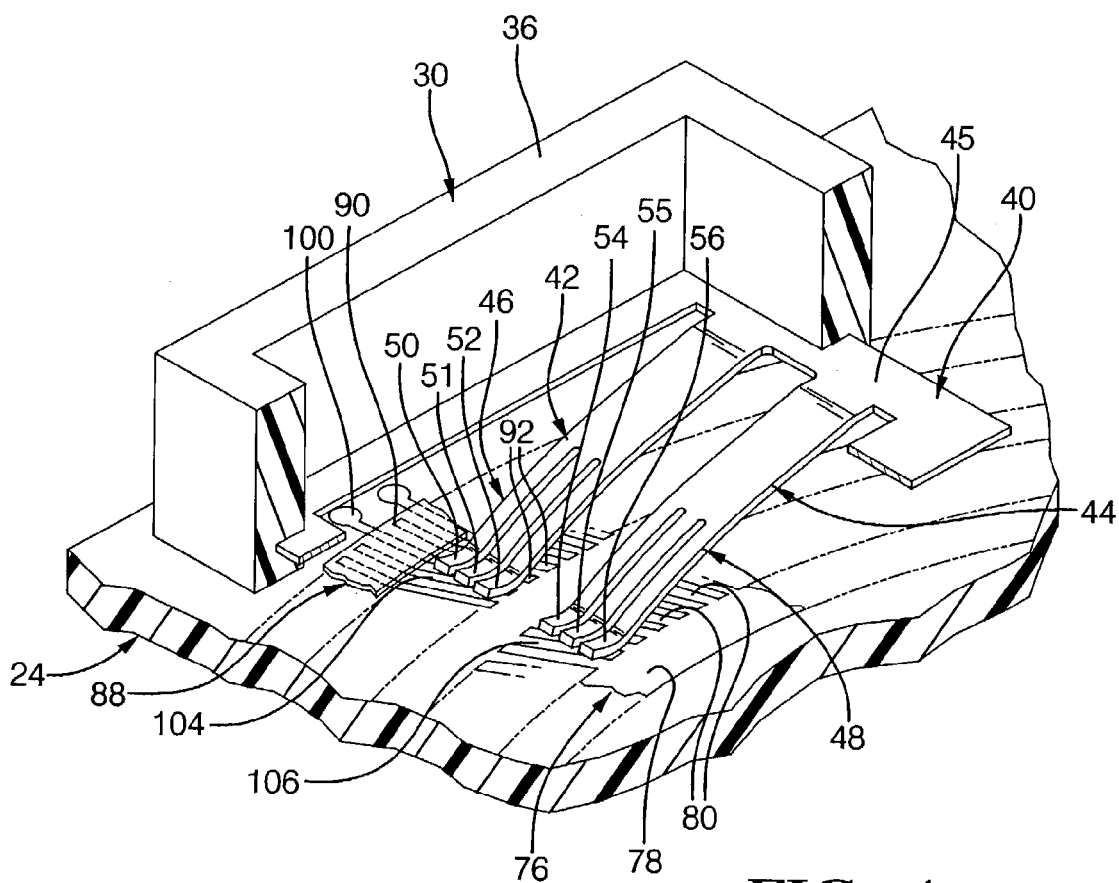
FIG. 4 is an enlarged view of a contact assembly.

This ink is particularly useful for depositing an electrode in a fuel level indication sensor, for example as used in a gas tank of a vehicle. Referring to FIGS. 2, 3, and 4, since the ink can be used in any design of fuel level indicator sensors, one embodiment of a combustion fuel level indicator system is provided for illustrative purposes. The fuel level indicator system includes a housing 20 having a recess 22 therein for carrying a resistor card 24. The housing 20 also has a recess or hole 26 therein for a hollow male portion 28 of a wiper assembly 30. The wiper assembly 30 is pivotally connected to the housing with the aid of a bushing 32, which extends through the hollow male portion 28. The wiper assembly includes a body portion 34 from which the hollow male portion 28 extends, an upper head portion 36 and a lower leg portion 38. The upper head portion carries a contact assembly 40 including a pair of spaced apart parallel arms 42, 44 connected together by a bridge 45. Each arm 42, 44 has a set of fingers 46, 48, preferably three, of spaced apart outwardly extending parallel fingers 50, 51, 52 and 54, 55, 56. Both sets of fingers 46, 48 are positioned to travel in an arc-shaped path consistent with the arc-shaped resistive path 88 or arc-shaped conductive path 76 on the ceramic card as described hereafter.

A float 58 is provided for vertical movement in a fuel tank and a lever 60 extends therefrom for engagement in the bushing. The lever extending from the float includes a head portion 62, which extends into a hole 64 in the bushing 32, and a downwardly extending body portion 66, which is captured, by prongs 68 extending outwardly from the leg portion 38 of the wiper assembly. As the float moves up and down due to the changes in fuel level, the lever extending therefrom causes the wiper assembly to rotate.

The resistive card includes a first contact pad 70 having a first wire 72 connected thereto to provide current to the contact pad. A conductive line 74 extends along one edge of the resistive card from the first contact pad 70 to an arc-shaped conductive path 76. The arc-shaped conductive path 76 includes an arc-shaped continuously solid base portion 78 and a plurality of spaced apart conductor lines 80 extending therefrom at an angle with respect to a radial line drawn from the center of the base portion's arc. A second contact pad 82 is provided having a second wire 84 secured thereto. A conductive line 86 extends along an opposite side of the resistive card from the second conductor pad to an arc-shaped resistive path 88. The arc-shaped resistive path includes an arc-shaped resistive ink pattern 90 overlying a plurality of spaced apart conductor lines 92 formed at a radial line drawn from the center of the resistive ink pattern's arc. A plurality of small contact pads 94 extends from the selective conductor lines 92 of the resistive path for purposes of laser trimming the resistive path.

As the float 58 moves up and down with respect to changing fuel levels, the lever 60 extending from the float causes the wiper assembly 30 to rotate. As the head 36 portion of the wiper assembly rotates, the first set of tangs or fingers 46 on the first contact arm 42 engage the conductor lines 92 of the resistive path 88 and the second set of tangs or fingers 48 on the second contact arm 44 engage the conductor lines 80 of the arc-shaped conductive path 76. With respect to both the resistive path 88 and conductive path 76, a top finger 50, 54 of the contact arm 42, 44 will engage one of the conductor lines 100, 102 and a third finger 52, 56 (parallel to the first finger) on the same arm will contact an adjacent conductor line 104, 106 respectively. Thus, because the conductor lines 80, 92 are formed at an angle with respect to a radial line drawn from the center of the arc of the resistive pattern or conductive base portion respectively, and the fingers 50 and 52, 54 and 56 on each arm are parallel, the contact arm is simultaneously contacting adjacent conductor lines thus minimizing or eliminating any problem associated with make brake contact of prior art resistor cards.

This fuel level indicator system can be disposed in a fuel tank of a vehicle. In operation, current is provided through a wire 72 to the first contact pad 70 and flows therefrom to the conductive path 74 printed on the resistor card. The set of fingers 48 on the second arm 44 of the contact wiper assembly engage at least two of the conductor lines 102, 106 on the conductive path 76. The current then flows across the contact 40 through the first arm 42 and first set of fingers 46 to at least two conductor lines 100, 104 on the resistive path 88. As the vehicle consumes fuel, the fuel float 58 moves with the fuel level, the wiper assembly rotates along the conductive and resistive paths. Consequently, a variable resistance to current is provided dependent upon where the contact engages the resistive path.

Another embodiment of a fuel level indicator sensor used may vary, for illustrative purposes only, an exemplary fuel level sensor is shown in FIGS. 5–8. Referring to FIG. 5, a fuel level sensor 120 includes a resistor element 122 and a float 124. Resistor element 122 has a substrate 123, wherein the substrate 1123 preferably comprises a metal coated with an electrically-insulating ceramic material. An especially preferred substrate comprises alumina. Disposed on the substrate 123 of resistor element 122 are two tracks, a conductive track 126, and a resistor track 128. Conductive track is connected to solder pad 130. Resistor track 128 is connected via fixed resistor 132 and conductor 134 to solder pad 136. Wires 138 and 140 are soldered to solder pads 130 and 136 for connection of fuel level sensor 120 to an analog or digital fuel gauge (not shown).

As an alternative to soldering wires 138 and 140 directly to resistor element 122, an edge-board-type connector having spring-loaded terminals crimped and/or soldered to wires 138 and 140 may be employed. With the edge-board connector in place on resistor element 122, the terminals would be biased against pads 130 and 136.

Figure 6:
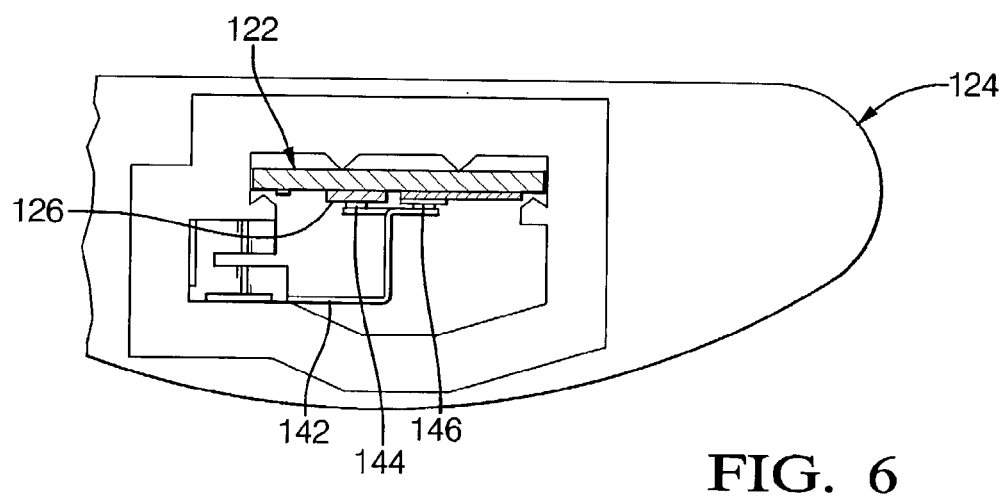
FIG. 6 is a top-cross-sectional view of a fluid level sensor taken through line 6—6 of FIG. 5.

Referring now additionally to FIG. 6, the float 124 includes a contact member 142 having contacts 144 and 146 which are electrically coupled to one another and are further biased against resistor element 122. In general, the contact member may comprise Ni, Ag, Pd, Cu, and alloys thereof, and combinations comprising at least one of the foregoing. The contact member may be fabricated by any one of various known techniques, such as, but not limited to, coined rivets, staked rivets, welded buttons, thin stamped strips, and the like. Additionally, the contact may include any geometrical shape so long as the contact slides over the segments (152 as shown in FIG. 7), it bridges across two adjacent segments. Therefore, the geometrical shape is preferably such that the contact member touches the electrode but does not bottom out against the substrate. Preferable shapes, however, include spoked or segmented shunts.

Referring again to FIGS. 1 and 2, Contact 144 rides in contact with conductive track 126 as float 124 moves up and down. Likewise, contact 146 rides in contact with resistor track 128 as float 124 moves up and down. Thus, as float 124 moves up and down with the level of fuel in the fuel tank, a variable resistance is coupled between solder pads 130 and 136. When float 124 is at its lowest extent (i.e., when the fuel tank is empty), fixed resistor 132 is coupled between solder pads 130 and 136.

The construction of resistor element 122 is described with reference to FIG. 7. Resistor material 148 is applied to the insulating substrate 123 of resistor element 122. The resistor material 148 includes a first portion 150 along the path followed by contact 146 of float 124 (FIG. 6). This first portion 150 is divided into discrete segments 152. Resistor material 148 further comprises a trim section 154. This trim section 154 is joined to discrete segments 152 of first portion 150. Resistor material 148 also comprises fixed resistor 132.

Now, with additional reference to FIG. 8, a conductor material 149 is applied on the substrate 123 of the resistor element 122. Note that the resistor material 148 described with reference to FIG. 7 is not shown in FIG. 8 for clarity of presentation. The conductor material 149 includes conductive track 126, conductor 134 and solder pads 130 and 136, as previously described with reference to FIG. 5. The conductor material 149 also includes a series of discrete pads 158. Pads 158 are electrically isolated from one another (but for the fact that they are in electrical communication with one another through resistor material 148 (FIG. 7). Pads 158 are located coincidentally on top of segments 152 of resistor material 48. Pads 158 are spaced such that contact 146 (FIG. 6) is always in contact with at least one pad 158, unless perhaps when float 124 (FIG. 5) is at the extreme top or bottom of its travel. That is, contact 146 will experience no discontinuities between pads 158.

Figure 9:
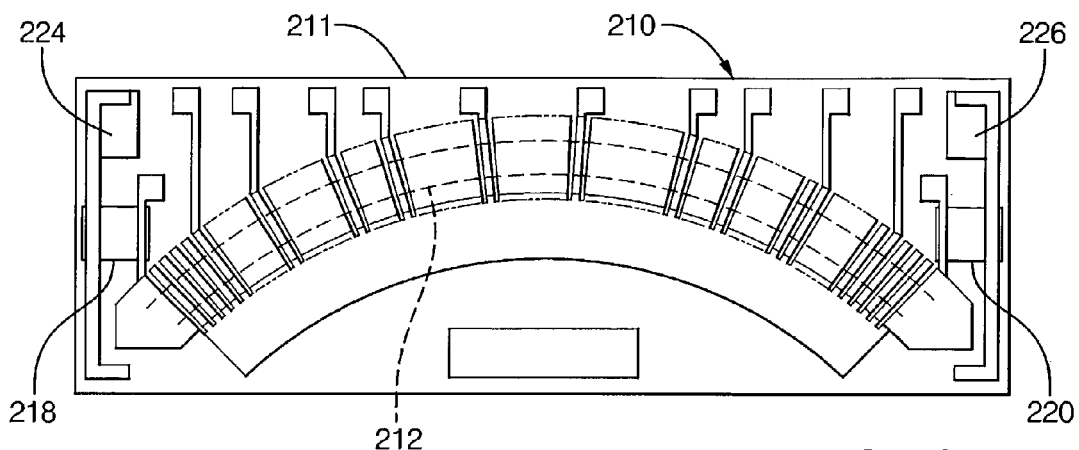
FIG. 9 is a front view of a resistor card for a fluid level sensor.

An alternative fuel level sensor having an angular resistive element is shown in FIG. 9. Angular resistive element 210 is designed for use in conventional fuel level sensors having a float attached to an arm. The float moves up and down with fuel level, moving a contact along a path 212. Angular resistive element 210 comprises a resistive layer and a conductive layer applied to an insulating substrate 211.

Figure 10:
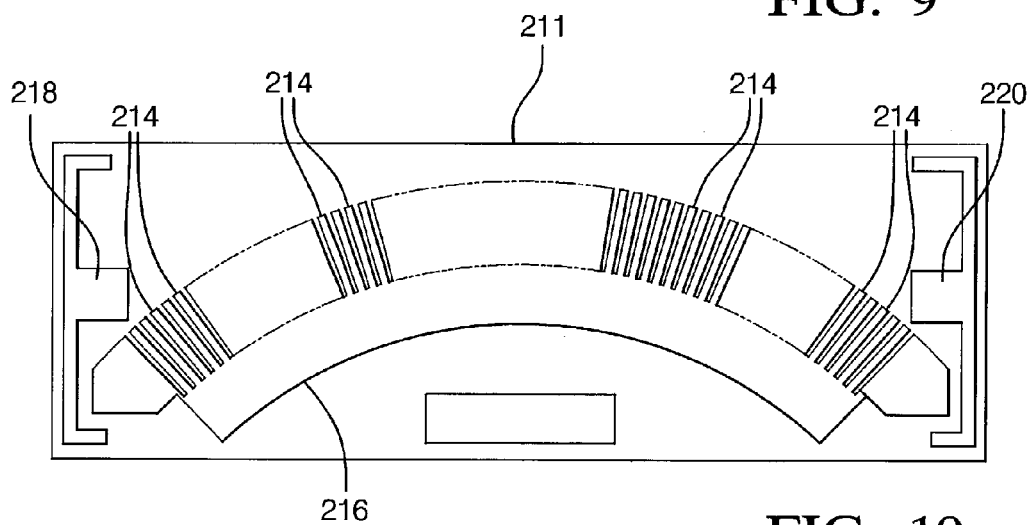
FIG. 10 is a front view of a substrate of a resistor card with a resistive layer applied.

FIG. 10 shows a resistive layer applied to insulating substrate 211. This resistive layer includes resistor material disposed in segments 214 disposed along path 212 (FIG. 9). These segments 214 are spaced apart by a small spacing. Segments 214 all contact a trim section 216. Fixed resistors 218 and 220, formed of resistor material, are also provided.

Figure 11:
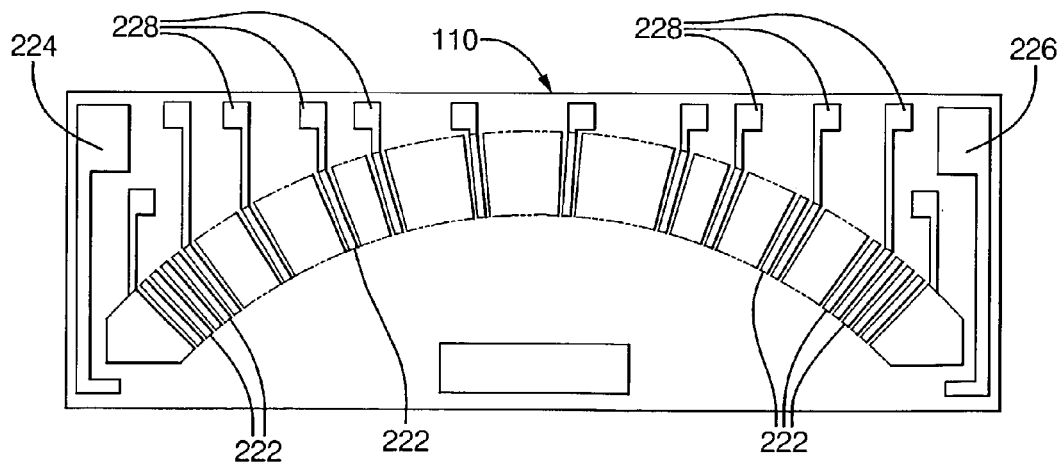
FIG. 11 is a front view of a substrate of a resistor card with a conductive layer applied.

FIG. 11 shows a conductive layer, which is added after the resistive layer. Note that the resistive layer of FIG. 10 is omitted in FIG. 11 for clarity of presentation. The conductive layer includes discrete pads 222, which are disposed coincidentally on segments 214 (FIG. 9) of resistor material. The conductive layer further includes solder pads 224 and 226. Additionally, the conductive layer includes test pads 228, for testing the resistance of the fuel level sensor containing angular resistive element 210. The conductive layer further comprises a conductive material.

Referring again to FIG. 9, a wire (not shown) is soldered to solder pad 224 or 226, depending upon which end of angular resistor element 210 is approached by the contact as the fuel level in the fuel tank decreases. A second wire is customarily coupled to the contact that moves along path 212 as the fuel level in the fuel tank changes. A variable resistance between those two wires is thus provided. This resistance is a function of the fuel level in the fuel tank and can be measured by a fuel gauge (not shown). Depending upon which solder pad 224 or 226 is employed, fixed resistor 218 or 220 provides a fixed resistance value when the fuel level in the fuel tank is empty.

The above-described ink is further described by the following examples, which are meant to be illustrative, not limiting.

EXAMPLES

Example 1

A thick film ink of 17.0 wt % 1-methoxy-2-propanol acetate solvent, 8.0 wt % butyl acetate solvent, 7.6 wt % acrylic resin binder, 3.2 wt % methyl methacrylate polymer, 9.0 wt % ethanol wetting agent, 51.2 wt % amorphous alloy $Pd_{47}Ni_{47}P_6$, and 6.4 wt % metallic silver, is made, based upon the total weight of the ink. An aluminum oxide fuel ceramic substrate is screen printed with the ink. The ink is fired up to 460° C. for 2 hours. The fired electrode includes 88.9 wt % amorphous alloy and 11.1 wt % metallic silver, based upon the total weight of the fired electrode.

Example 2

Surfaces not intending to be covered on an aluminum oxide substrate are masked off. Amorphous alloy $Pd_{40}Ni_{40}Cu_{15}P_5$ particles in a suspension with nickel sulfamate solution are electroless deposited onto the masked aluminum oxide substrate. A nickel matrix with amorphous alloy inclusions is deposited. The inclusions having a diameter of about 0.5 $\mu$m to 10 $\mu$m make up about 38 wt % of the electrode volume. The substrate is fired 490° C. for 2 hours. The fired electrode includes 67.9 wt % amorphous alloy and 22.1 wt % nickel, based upon the total weight of the fired electrode.

Example 3

A thick film ink of 34.8 wt % 1-ethoxypropan-2-ol solvent, 5.0 wt % cellulose ethylether resin, 7.0 wt % ethanol wetting agent, 47.6 wt % amorphous alloy $Zr_{55}Cu_{30}Ni_5Al_{10}$, and 5.6 wt % $Sn_{85}In_{11}Ag_3Cu_1$ is made, based upon the total weight of the ink. An aluminum oxide fuel ceramic substrate is screen printed with the ink. The ink is fired up to 360° C. for 2 hours. This ink has desirable reflow properties at temperatures as low as 240° C. The fired electrode includes 89.4 wt % amorphous alloy and 10.6 wt % $Sn_{85}In_{11}Ag_3Cu_1$, based upon the total weight of the fired electrode.

Example 4

An exemplary electrode comprises a thick film of an amorphous material comprising about a 140 micrometer layer metal material such as $Ag_{51}Pd_{22}Ni_{12}P_6$ bonded to the substrate. The substrate is fired at about 640° C. The fired electrode includes 100 wt % amorphous alloy $Ag_{51}Pd_{22}Ni_{12}P_6$, based upon the total weight of the fired electrode.

In one embodiment, the amorphous metal material can be employed as an electrode for a fuel level sensor where the electrode is disposed on a substrate, with a second electrode (preferably comprising an amorphous metal material) is disposed in a spaced relationship on the substrate from the first electrode such that, upon a change in resistance between the electrodes, a fuel level can be determined.

In another embodiment, the amorphous metal material can be utilized alone or in combination with a catalyst to form a gas or particulate sensor. In the gas sensor, a sensing electrode and/or a reference electrode comprise the amorphous metal material, wherein the optional crystalline material (e.g., the fourth type and/or the nanocrystalline material in the amorphous material) comprises a catalyst (e.g., platinum, palladium, gold, rhodium, iridium, ruthenium, zirconium, yttrium, cerium, calcium, aluminum, and the like, as well as alloys, oxides, and combinations comprising at least one of the foregoing catalysts). The sensing electrode and reference electrode are disposed on an electrolyte (e.g., on opposite sides of an electrolyte for a gas sensor, and on the same side of the electrolyte for a particulate sensor), with a protective layer disposed over at least the sensing electrode (e.g., spinel and/or aluminum oxide, or the like). For example, an amorphous metal ribbon approximately 2.6 mm wide and 0.022 mm thick is bonded to the sensor substrate with an epoxy.

In particular, disclosed herein is an oxidation resistant electrode material for use as an electrode wherein the oxidation resistance reduces the sulfidation between the electrode and its corresponding substrate, improves the durability of the electrode, and lowers the manufacturing cost of the electrode. The electrode disclosed herein can, wholly or partially, substitute for the crystalline metal(s) used in electrodes, e.g., fuel level indicator sensor electrodes. The substitution can be by alternating layers, as a mixture (e.g., amorphous and crystalline metal mixture).

Due to the high costs of the various metals employed in the electrode, since the crystalline metal ink formulation is formed as a much thicker electrode than is necessary with the amorphous metal material ink electrode (e.g., the crystalline metal electrode can be as much as an order of magnitude thicker than the amorphous metal material electrode, with more than 3 times thicker common), a substantial cost savings can be realized. For example, a crystalline metal electrode is typically has a thickness of great than or equal to about 100 micrometers. In contrast, an amorphous metal electrode has a thickness of less than or equal to 50 micrometers, with less than or equal to about 30 micrometers common, less than or equal to about 20 micrometers attainable, and less than or equal to about 10 micrometers believed possible, while maintaining the functioning of the electrode in a manner at least equal to that of a crystalline metal electrode. Additionally, the amorphous metal material electrode bears greater resistance to sulfur poisoning than do crystalline metal electrodes, thereby enhancing the life of the electrodes Electrodes that do not comprise an amorphous metal material adsorb sulfur and sulfide, which causes resistance and ultimately failure. Consequently, these electrodes are not useful in gasoline and diesel fuel type applications. In contrast, electrodes comprising the amorphous metal material are durable, able to survive exposure to gasoline and diesel fuel applications. Amorphous metals do not have grain boundaries, so there are no corrosion initiation sites. Amorphous metals exhibit extremely high wear resistance, better than the widely used silicon nitride, $Si_2N_4$. These properties result in a fuel level sender much better than any in the industry.

A further advantage of the electrode comprising the amorphous metal material is that the amorphous material is hard, strong, and tough (e.g., hardness of about 15 gigapascals (GPa), strength of 2.8 GPa, and fracture toughness of about 300 ($MPa/m^2$)). In contrast, tool steel has a hardness of about 7.5 gigapascals (GPa), strength of 1.7 GPa, and fracture toughness of about 30 $MPa/m^2$. While other metals soften with strain, amorphous metals harden with strain; are the only metals known to harden with strain. Consequently, electrodes comprising the amorphous metal material will have substantially enhanced durability and hardness, thereby rendering the electrodes useful in a variety of applications requiring such durability. Consequently, it is believed that the amorphous metal material enhances the strength of the electrode to greater than twice the strength of a non-amorphous material electrode, with the hardness similarly enhanced, and the fracture toughness substantially more enhanced. Physical property enhancements expands the usefulness of the electrodes.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fuel level sensor, comprising:
    a resistive card having an arc shaped resistive path comprising a first set of spaced apart connector lines and an arc-shaped electrode overlying the first set of conductor lines; and
    an arc-shaped conductive path comprising an arc-shaped continuous conductor base and a second set of spaced apart parallel conductor lines extending from the conductor base at an angle with respect to a radial line drawn from a center of the arc-shaped conductor base;
    wherein the electrode comprises an amorphous metal material comprising a first metal selected from the group consisting of a Group 9 metal, a Group 10 metal, a Group 11 metal, and combinations comprising at least one of the foregoing first metals, and zirconium or at least one of phosphorus and boron.

2. The sensor of claim 1, wherein the amorphous metal material comprises zirconium and further comprising at least one of aluminum and titanium.

3. The sensor of claim 1, wherein the amorphous metal material coating is at least partially disposed over a ductile material.

4. The sensor of claim 3, wherein the ductile material is selected from the group consisting of cobalt, nickel, silver, aluminum, iron, and combinations comprising at least one of the foregoing ductile materials.

5. The sensor of claim 3, wherein the ductile material comprises less than or equal to about 0.1 wt % anions based upon the total weight of the ductile material.

6. The sensor of claim 1, wherein the first electrode comprises greater than or equal to about 50 wt % of the amorphous metal material based on the total weight of the first electrode.

7. The sensor of claim 1, wherein the first electrode comprises greater than or equal to about 75 wt % of the amorphous metal material based on the total weight of the first electrode.

8. The sensor of claim 1, wherein the first electrode comprises greater than or equal to about 85 wt % of the amorphous metal material based on the total weight of the first electrode.

9. The sensor of claim 1, wherein the first electrode comprises greater than or equal to about 95 wt % of the amorphous metal material based on the total weight of the first electrode.

10. The sensor of claim 1, wherein the amorphous metal material comprises about 10 at % to about 98 at % of the first material and less than or equal to about 45 at % of a second metal selected from the group consisting of aluminum, copper, silver, gold, and combinations comprising at least one of the foregoing second metals, and about 0.5 at % to about 30 at % of the at least one of phosphorus and boron.

11. The sensor of claim 1, wherein the amorphous metal material comprises about 20 at % to about 94 at % of the first material and less than or equal to about 45 at % of a second metal selected from the group consisting of aluminum, copper, silver, gold, and combinations comprising at least one of the foregoing second metals, and about 3 at % to about 30 at % of the at least one of phosphorus and boron.

12. The sensor of claim 1, wherein the amorphous metal material comprises about 45 at % to about 94 at % of the first material and less than or equal to about 45 at % of a second metal selected from the group consisting of aluminum, copper, silver, gold, and combinations comprising at least one of the foregoing second metals, and about 6 at % to about 30 at % of the at least one of phosphorus and boron.

13. The sensor of claim 1, wherein the first electrode further comprises layers having a layer thickness of less than or equal to about 100 micrometers, and has a total thickness of about 100 micrometers to about 500 micrometers.

14. The sensor of claim 1, wherein the electrode further comprises a bonding material selected from the group consisting of an epoxy, a metal, a catalyst, and combinations comprising at least one of the foregoing bonding materials.

15. The sensor of claim 14, wherein the bonding material is mixed with the amorphous material.

16. The sensor of claim 14, wherein the bonding material is disposed between the amorphous material and the ceramic substrate.

17. The sensor of claim 1, further comprising alternating layers of a ductile layer having a ductile layer thickness of less than or equal to about 8 micrometers and an amorphous metal material layer, and wherein the electrode has a thickness of less than or equal to about 75 micrometers.

18. The sensor of claim 17, wherein the ductile layer comprises a ductile metal selected from the group consisting of ductile nickel, ductile copper, ductile cobalt, ductile indium, ductile bismuth, ductile lead, ductile cadmium, ductile tin, and alloys and combinations comprising at least one of the foregoing ductile metals.

19. A method for detecting fuel level, comprising:
contacting a fuel level sensor with a fuel in a fuel storage vessel, wherein the fuel level sensor comprises:
a resistive card having an arc shaped resistive path comprising a first set of spaced apart connector lines and an arc-shaped electrode overlying the first set of conductor lines; and
an arc-shaped conductive path comprising an arc-shaped continuous conductor base and a second set of spaced apart parallel conductor lines extending from the conductor base at an angle with respect to the radial line drawn from a center of the arc-shaped conductor base;
wherein the electrode comprises an amorphous metal material comprising a first metal selected from the group consisting of a Group 9 metal, a Group 10 metal, a Group 11 metal, and combinations comprising at least one of the foregoing first metals, and zirconium or at least one of phosphorus and boron; and
determining the resistance between the connector lines and using the resistance to determine the level of the fuel.

20. A fuel level sensor, comprising:
a resistive card having a resistive path comprising a first set of spaced apart connector lines and an electrode overlying the first set of conductor lines; and
a conductive path comprising a continuous conductor base and a second set of spaced apart parallel conductor lines extending from the conductor base;
wherein the electrode comprises an amorphous metal material comprising a first metal selected from the group consisting of a Group 9 metal, a Group 10 metal, a Group 11 metal, and combinations comprising at least one of the foregoing first metals, and zirconium or at least one of phosphorus and boron.

21. A fuel level sensor, comprising:
a resistive card having an arc shaped resistive path comprising an arc-shaped electrode;
wherein the electrode comprises an amorphous metal material comprising a first metal selected from the group consisting of a Group 9 metal, a Group 10 metal, a Group 11 metal, and combinations comprising at least one of the foregoing first metals, and zirconium or at least one of phosphorus and boron.

* * * * *